(12) United States Patent
Ochiai et al.

(10) Patent No.: US 7,322,768 B2
(45) Date of Patent: Jan. 29, 2008

(54) COVER

(75) Inventors: Hiroyuki Ochiai, Kasugai (JP); Shinji Yoshida, Komaki (JP)

(73) Assignee: Tokai Rubber Industries, Ltd., Komaki-shi (JP)

( * ) Notice: Subject to any disclaimer, the term of this patent is extended or adjusted under 35 U.S.C. 154(b) by 137 days.

(21) Appl. No.: 10/781,800

(22) Filed: Feb. 20, 2004

(65) Prior Publication Data

US 2004/0170469 A1 Sep. 2, 2004

(30) Foreign Application Priority Data

Feb. 28, 2003 (JP) ............... 2003-053109
Dec. 25, 2003 (JP) ............... 2003-430984

(51) Int. Cl.
*F16C 11/00* (2006.01)
*F18D 1/12* (2006.01)
*F02B 77/11* (2006.01)

(52) U.S. Cl. ...................... 403/135; 403/122

(58) Field of Classification Search ............... 403/76, 403/122, 132–135, 140, 142, 220, 223, 226; 411/104, 512; 16/2.1
See application file for complete search history.

(56) References Cited

U.S. PATENT DOCUMENTS

| | | | | |
|---|---|---|---|---|
| 1,261,770 A | * | 4/1918 | Collier | 403/140 |
| 3,164,054 A | * | 1/1965 | Biesecker | 16/2.1 |
| 3,861,812 A | * | 1/1975 | Ito | 403/141 |
| 3,909,084 A | * | 9/1975 | Snidar et al. | 403/135 |
| 4,522,378 A | * | 6/1985 | Nelson | 16/2.1 |
| 6,164,861 A | * | 12/2000 | Maughan | 403/135 |
| 6,206,604 B1 | * | 3/2001 | Dembowsky et al. | 403/134 |
| 6,692,176 B1 | * | 2/2004 | Fladhammer | 403/135 |
| 7,040,833 B2 | * | 5/2006 | Kondoh | 403/140 |
| 2002/0114660 A1 | * | 8/2002 | Burton | 403/122 |
| 2003/0180089 A1 | * | 9/2003 | Heuser et al. | 403/135 |
| 2005/0175398 A1 | * | 8/2005 | Contero et al. | 403/122 |

FOREIGN PATENT DOCUMENTS

EP 0 902 198 A2 3/1999
JP 5-30519 4/1993

* cited by examiner

*Primary Examiner*—James Brittain
*Assistant Examiner*—Ruth C. Rodriguez
(74) *Attorney, Agent, or Firm*—Oblon, Spivak, McClelland, Maier & Neustadt, P.C.

(57) ABSTRACT

A cover includes a cover body, a grommet, and a projection. The cover body includes a socket disposed on one of the front and rear opposite surfaces. The grommet is deformable, is held in the socket, and includes a fitting hole. The projection projects from an installation member to which the cover is installed, and is fitted into the fitting hole of the grommet, whereby holding the cover body detachably to the installation member. The grommet further includes convexities disposed on the outer peripheral surface at least, protruding in radial directions, and contacting with the inner peripheral surface of the socket at least. By the elastically deforming convexities, not only the cover is improved in terms of the attachment and detachment operability but also is enhanced in terms of the stability when being installed to the installation member.

8 Claims, 4 Drawing Sheets

COVER

BACKGROUND OF THE INVENTION

FIELD OF THE INVENTION

The present invention relates to covers, such as automobile engine covers, which are installed to installation members, such as engine blocks. More specifically, it relates to structural improvements for installing the covers.

In the engine room of vehicles, there are disposed an engine cover, side covers, an oil pan cover and an under cover, which are made of metallic plates or hard resins, in order to insulate sounds emitted from noise sources such as the engine. For example, engine covers, which are fixed at the top of engine blocks, not only insulate sounds emitted from engines, but also function to upgrade the appearance in engine rooms.

In order to readily carry out maintenance, it is necessary to detachably install engine covers to engine blocks. Moreover, when the vibrations of engines are transmitted directly to engine covers, noises occur by the vibrations of the engine covers themselves, and accordingly it is required to dispose means for damping the vibrations. Consequently, engine covers have been installed to engine blocks with bolts by way of rubber grommets conventionally.

However, covers installed to engine blocks with bolts have a problem with poor appearance, because the head of the bolts are exposed in the body of the covers partially. Moreover, the installation operability might be troubled, because the space for rotating tools is small in many cases. Hence, devices for installing covers have been proposed recently, devices which enable an operator or robot to install covers by simply pressing the body of the covers, without using bolts.

As illustrated in FIG. 9, U.S. Pat. No. 6,206,604 sets forth to detachably install a cover to an installation member in the following manner, for example. An insert member 200, which is composed of an elastomer, is held by engagement to a socket 101, which is formed on the rear surface of a cover body 100. Then, a male member 300, which has a spherical head 301 and projects from an installation member, is fitted into a sphere-shaped fitting portion 201, which is formed in the insert member 200. In accordance with the structure for installing covers, it is possible not only to damp the vibrations of the cover body 100 by the insert member 200, but also to readily install the cover body 100 to the installation member by simply pressing the male member 300 to the fitting portion 201. Moreover, the installation structure gives good appearance, because the male member 300 is not exposed in the surface of the cover body 100.

Moreover, Japanese Unexamined Utility Model Publication (KOKAI) No. 5-30,519 sets forth to detachably install a cover to an installation member in the following manner. An eyelet member is held by engagement to the body of a cover. Then, a pin, which protrudes from an installation member, is fitted into the eyelet member. In the cover installation structure, a flange, which is disposed on a socket of the cover, is engaged with a concaved portion, which is formed around the eyelet member, and a reinforcement plate is fastened to the top and bottom surfaces of the eyelet member. As a result, it is possible to inhibit such drawbacks that the eyelet member is deformed to warp when installing the cover to the installation member; and that the eyelet member comes off from the cover body when detaching the cover from the installation portion.

However, the installation structure set forth in U.S. Pat. No. 6,206,604 suffers from a such problem that it lacks stability because the insert member 200 is thinned out to improve the insertability so that the cover body 100 shakes when the cover is installed to the installation member. Moreover, it suffers from a such problem that the male member 300 is likely to come off from the sphere-shaped fitting portion 201 because the fitting portion 201 does not contact with the male member 300 on the lower side, though the fitting portion 201 is coupled with the spherical head 301 of the male member 300 on the upper side. In addition, the installation operability might be deteriorated because air resides within the fitting portion 201 when fitting the male member 300 into the fitting portion 201.

Moreover, the installation structure set forth in Japanese Unexamined Utility Model Publication (KOKAI) No. 5-30,519 also suffers from such problems that the stability of the cover body degrades; and that the pin is likely to come off from the eyelet member when the insertability of the pin is improved.

SUMMARY OF THE INVENTION

The present invention has been developed in view of such circumstances. It is therefore an object of the present invention to provide a cover whose body can be attached to and detached from an installation member with ease, whose assemblability is kept to be satisfactory, and which can exhibit such stability that the body does not shake when being installed.

A cover according to the present invention can solve the aforementioned problems, and comprises:

a cover body being hard, being formed as a plate shape, comprising opposite surfaces and a socket protruding partially from one of the opposite surfaces, the socket having an inner peripheral surface;

a grommet held in the socket, being deformable elastically, and comprising a fitting hole and an outer peripheral surface, the fitting hole having an inner peripheral surface; and a projection projecting from an installation member to which the cover is installed, and comprising a head, a neck having a diameter smaller than that of the head and an outer peripheral surface, the projection fitted into the fitting hole of the grommet, whereby holding the cover body detachably to the installation member, the grommet further comprising a plurality of convexities disposed on at least one of the outer peripheral surface and the inner peripheral surface of the fitting hole, protruding in radial directions, and contacting with at least one of the inner peripheral surface of the socket and the outer peripheral surface of the projection.

The grommet can preferably be held detachably in the socket; and the convexities can preferably be disposed on the outer peripheral surface of the grommet. In this instance, the grommet can further preferably be held in the socket in such a manner that the convexities contact with the inner peripheral surface of the socket elastically. Moreover, the convexities can desirably be formed as a substantially triangular cross-sectional shape whose thickness reduces from large to small in the direction away from the bottom to the top.

The fitting hole of the grommet can preferably be formed as a tapered shape whose inner peripheral surface has a diameter enlarging from small to large in the direction approaching the installation member.

Moreover, the projection can preferably have a superficial configuration comprising the head, the neck continuing from the head smoothly, and a bottom having a larger diameter than that of the neck; and the inner peripheral surface of the fitting hole of the grommet can preferably agree with the superficial configuration of the projection and contacts with the projection entirely. In addition, the projection can desirably penetrate through the fitting hole, and comprise an outer peripheral surface whose diameter reduces from large to small in the direction away from the head to the neck at least and which contacts with the inner peripheral surface of the fitting hole.

Still further, the grommet can desirably further comprise a regulator disposed at a portion facing the head of the projection and extending radially inward to close the fitting hole, the regulator provided with an air vent hole communicating the fitting hole with the outside.

Thus, the present cover is improved in terms of the attachment and detachment operability by the elastic deformation of the convexities. Moreover, it is enhanced in terms of the stability when being installed to the installation member because the cover body is inhibited from moving relatively with respect to the installation member by the elastic reaction force of the convexities.

When the convexities are formed on the outer peripheral surface of the grommet, it is possible to hold the grommet in the socket in such a manner that the convexities contact with the inner peripheral surface of the socket elastically. As a result, it is possible to inhibit the grommet from coming off from the socket by the elastic reaction force of the convexities. Therefore, it is possible to reduce the man-hour requirement for reinstalling the present cover to the installation member because the grommet remains on the cover body when the cover is detached from the installation member.

Moreover, when the grommet further comprises a regulator disposed at a portion facing the head of the protrusion and extending radially inward to close the fitting hole, it is possible to position the fitting hole with ease upon fitting it with the projection. In addition, when the regulator is provided with an air vent hole communicating the fitting hole with the outside, the operability is high upon fitting the projection into the fitting hole because no air pool occurs between the grommet and the projection.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Figure 1:
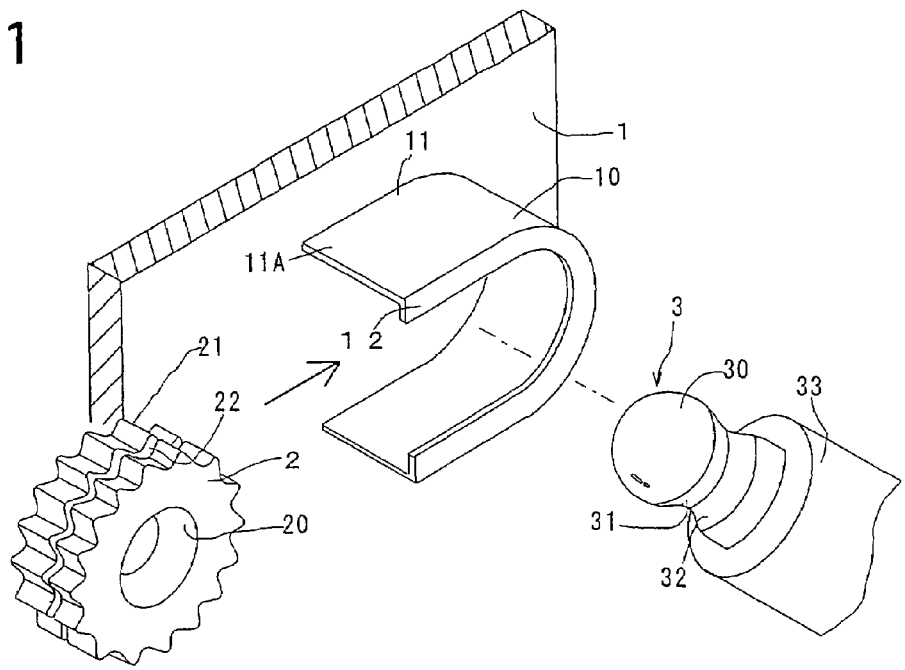
FIG. 1 is an exploded perspective view of a cover according to Example No. 1 of the present invention.

Having generally described the present invention, a further understanding can be obtained by reference to the specific preferred embodiments which are provided herein for the purpose of illustration only and not intended to limit the scope of the appended claims.

In the present cover, the grommet comprises a plurality of convexities. The convexities are disposed on at least one of the outer peripheral surface of the grommet and the inner peripheral surface of the fitting hole, protrude in radial directions, and contact with at least one of the inner peripheral surface of the socket and the outer peripheral surface of the projection. Therefore, when the cover body tries to move relatively in radial directions with respect to the projection, at least one of the inner peripheral surface of the socket and the outer peripheral surface of the projection presses to compress the convexities. Accordingly, an elastic reaction force is generated in the convexities. The greater the relative movement of the cover body is, the larger the elastic reaction force is generated in the convexities. Consequently, it is possible to effectively inhibit the cover body from shaking. As a result, the cover body is improved in terms of the stability.

Moreover, the grommet is held in the socket which protrudes partially from one of the opposite surfaces of the cover body. Accordingly, when the socket is disposed on the rear opposite surface of the cover body, it is easy so as not to expose the projection in the front opposite surface of the cover body when the cover body is installed to the projection. Consequently, it is possible to inhibit the appearance of the cover body from being impaired by the exposed projection.

The cover body is hard, and is formed as a plate shape. The cover body can be formed of resins and metallic plates. The socket can be fixed to the cover body, or can be integral with the cover body. Moreover, the cover body can be provided with a sound-absorbing layer composed of foamed substances. The sound-absorbing layer can be disposed on the rear opposite surface of the cover body. However, depending on specific applications, the cover body can be buried in the sound-absorbing layer.

The socket is formed so as to partially protrude from one of the opposite surfaces of the cover body. The socket can be formed on the rear opposite surface of the cover body, or can be formed so as to penetrate through the cover body. Moreover, the socket can be formed in the following manner: a through hole is formed so as to penetrate through the front and rear opposite surfaces of the cover body; and the periphery of the through hole is made into the socket on the front opposite surface of the cover body. When the priority is given to the decorativeness of the cover body, it is desirable to form the socket on the rear opposite surface of the body lest the socket is exposed in the front opposite surface of the cover body.

The socket can desirably hold the grommet detachably. For example, it is possible to use such a socket that comprises a pair of upright walls at least, the upright walls facing in a separated manner and contacting with the outer peripheral surface of the grommet. Moreover, the socket can further preferably be formed as substantially cylinder shapes comprising an upright wall which contacts with a major part of the outer peripheral surface of the grommet. However, in view of the grommet insertability, the socket can preferably be formed as halved cylinder shapes from which a part of the upright wall is removed. In addition, in order to inhibit the grommet from coming off from the socket, the socket can be formed as substantially letter-"U" shapes whose upright walls are extended toward the opening end.

The grommet, one of the features of the present cover, can be formed of elastic substances such as rubber and thermoplastic elastomer. The grommet is provided with a plurality of convexities. The convexities are disposed on at least one of the outer peripheral surface of the grommet and the inner peripheral surface of the fitting hole, and protrude in radial directions. The convexities can be formed in a dotted manner, or can be formed as a convexed streak which continues in the axial direction or radial direction of the grommet. However, the convexities can desirably be formed uniformly so that the grommet can be held stably in the socket. For example, when the convexities are projections which are formed in a dotted manner, the projections can preferably be scattered uniformly on at least one of the outer peripheral surface of the grommet and the inner peripheral surface of the fitting hole. Moreover, when the convexities are convexed streaks which extend in the axial direction of the grommet, three or more convexed streaks can preferably be formed uniformly in the circumferential direction of the grommet. In addition, when the convexities are convexed streaks which extend in the circumferential direction of the grommet, two or more convexed streaks can desirably be formed in a well balanced manner in the axial direction of the grommet. Note that, in view of the formability with dies, the convexities can preferably be formed as convexed streaks which extend in the axial direction of the grommet.

The convexities can further preferably be formed as a substantially triangular cross-sectional shape whose thickness reduces from large to small in the direction away from the bottom to the top. When the convexities are formed as such a shape, drawbacks like bent convexities are inhibited, and the stability of the cover body is furthermore improved because the convexities are compressed securely upon the relative movement of the cover body with respect to the projection. Moreover, the grommet insertability is upgraded as well.

The grommet can be held in the socket lest it comes off from the socket. However, when there arise cases where the cover body is removed from the installation portion during maintenance, the grommet can preferably be held detachably in the socket. In this instance, considering the installation operability, the grommet can desirably remain on the cover body, not on the projection, when the cover body is removed from the installation member. This results from the following fact: if the grommet remains on the projection, the grommet should be removed from the projection when reinstalling the cover body to the installation member. Specifically, the cover body should be reinstalled to the installation member after removing the grommet from and reattaching it into the socket, and accordingly the operation has resulted in increasing the man-hour requirement considerably.

In order to have the grommet thus remained on the cover body, the convexities can desirably be formed on the outer peripheral surface of the grommet. Thus, the grommet can be held in the socket in such a manner that the convexities contact with the inner peripheral surface of the socket elastically, and accordingly it is possible to inhibit the grommet from coming off from the socket by the elastic reaction force of the convexities. Moreover, when the grommet is provided with a groove which engages with the socket, it is possible to securely leave the grommet on the cover body. In this instance, it is possible to form the convexities on the surface of the groove which is formed in the outer peripheral surface of the grommet. Hereinafter, the present cover will be described with reference to the specific mode in which the convexities are formed on the outer peripheral surface of the grommet.

Into the fitting hole of the grommet, there is fitted the projection which comprises a head, a neck having a diameter smaller than that of the head and an outer peripheral surface. The projection can be made of metals in general, but can be made of resins in certain applications. Moreover, the projection can be integral with the installation member, or can be fixed to the installation member.

The inner peripheral surface of the fitting hole of the grommet can desirably agree with a superficial configuration of the projection and contact with the projection entirely. Thus, it is possible to securely inhibit the relative movements between the projection and the grommet in the radial directions of the projection. Moreover, the projection can further preferably have a superficial configuration which comprises the head, the neck continuing from the head smoothly, and a bottom having a larger diameter than that of the neck. The head and bottom, which exist at the opposite ends of the neck and whose diameter is larger than that of the neck, can securely inhibit the relative movements between the projection and the grommet in the axial directions of the projection.

When the projection has a superficial configuration which comprises the bottom having a larger diameter than that of the neck, the opening of the fitting hole can preferably be formed as a tapered shape on the projection inlet side, tapered shape whose diameter reduces from large to small in the direction away from the projection inlet side to the inside. The tapered shape guides the projection to make it easy to position the projection when fitting the projection into the fitting hole. Moreover, when fitting the projection into the fitting hole, the operability is furthermore improved because the convexities can deform elastically more easily. In addition, when the bottom is formed so as to contact with the grommet, it is possible to securely inhibit the relative movements between the projection and the grommet in the axial directions of the projection. Still further, when the grommet and the projection are engaged at a plurality of positions, it is possible to securely inhibit the relative movements between the projection and the grommet in the radial directions of the projection.

The projection can further desirably penetrate through the fitting hole, and comprise an outer peripheral surface whose diameter reduces from large to small in the direction away from the head to the neck at least and which contacts with the inner peripheral surface of the fitting hole. Thus, when the projection tries to move in the direction coming off from the fitting hole, the grommet is subjected to large diametrically-enlarging forces. This because, among the vectors of the pressing forces exerted to the inner peripheral surface of the fitting hole by the diametrically-reducing outer peripheral surface of the projection, the vectors of the forces heading in the radial directions of the fitting hole enlarge. Accordingly, the convexities are compressed more so that the grommet is held firmly in the socket by the reaction force. Consequently, it is possible to remove the cover body from the installation member while leaving the grommet securely on the cover body.

On the other hand, the projection can be prohibited from penetrating through the fitting hole. For example, when the grommet further comprises a regulator which is disposed at a portion facing the head of the projection and which extends radially inward to close the fitting hole, the regulator can make it easier to position the projection when being fitted into the fitting hole. Moreover, when the regulator is provided with an air vent hole which communicates the fitting hole with the outside, the operability is high upon fitting the projection into the fitting hole because no air pool occurs between the grommet and the projection.

EXAMPLES

Hereinafter, the present cover will be described in detail with reference to specific examples.

Example No. 1

Figure 3:
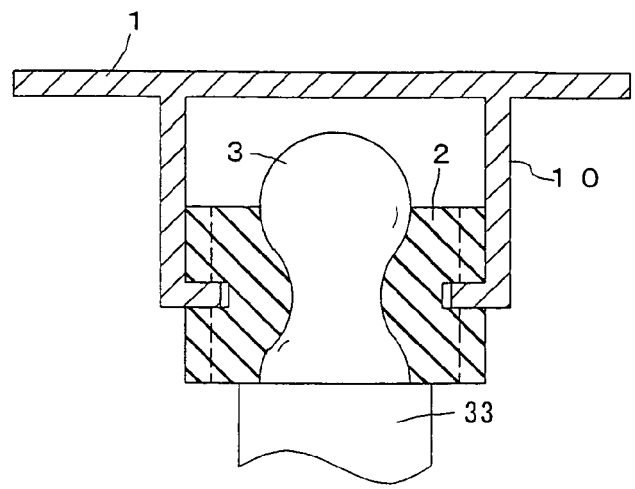
FIG. 3 is a cross-sectional view for illustrating the cover according to Example No. 1 after fitting the projection thereinto.

FIG. 1 illustrates an exploded perspective view of the present cover according to Example No. 1, and FIG. 3 illustrates a cross-sectional view of the same. The cover comprises a cover body 1 made of hard resin and formed as a plate shape, a grommet 2 made of rubber, and a projection 3 made of metal. The cover body 2 has a halved cylinder-shaped socket 10 which is disposed on the rear opposite surface. The grommet 2 is held by fitting in the socket 10, and has a fitting hole 20 at the center. The projection 3 is fitted into the fitting hole 20, and projects from an engine block.

The socket 10 comprises a halved cylinder-shaped peripheral wall 11, extensions 11A, and a flange 12. The peripheral wall 11 protrudes from the rear opposite surface of the cover body 1. The extensions 11A are formed substantially linearly, and extend toward the opening of the socket 10 parallelly to each other. The flange 12 is disposed at the leading end of the peripheral wall 11, and extends inward in the radial directions. Here, note that it is possible to fit the grommet 2 into the socket 10 horizontally (i.e., in the direction designated by the arrow of FIG. 1) without forcibly pressing the grommet 2 into the socket 10, because the socket 10 is provided with the opening. Moreover, there is no fear that the grommet 2 comes off from the socket 10, because the socket 10 is provided with the extensions 11A.

Figure 2:
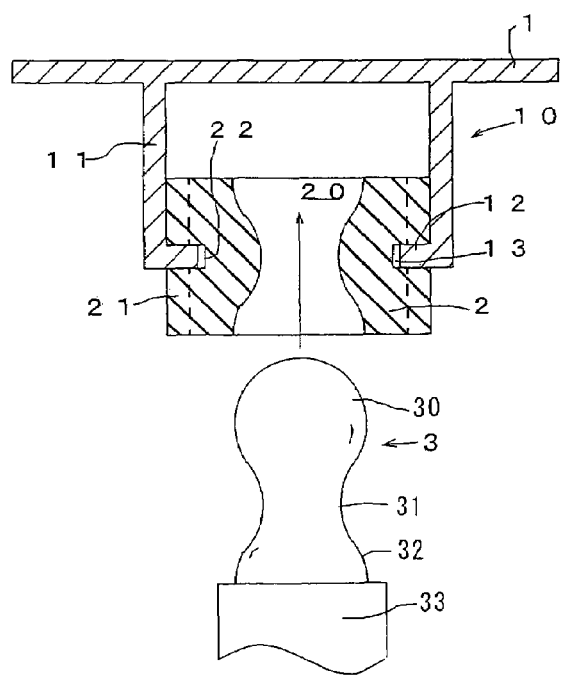
FIG. 2 is a cross-sectional view for illustrating the cover according to Example No. 1 before fitting a projection thereinto.

The grommet 2 is formed as a substantially cylinder shape as a whole. On the outer peripheral surface of the grommet 2, a plurality of convexed streaks 21 are formed uniformly in the circumferential direction of the grommet 2, convexed streaks 21 which extend parallelly to each other in the axial direction of the grommet 2. The convexed streaks 21 are formed as a substantially triangular cross-sectional shape whose thickness reduces from large to small in the direction away from the bottom to the top. Moreover, on the outer peripheral surface of the grommet 2, an annular groove 22 is formed at the middle in the axial direction of the grommet 2, annular groove 22 which goes around the outer periphery of the grommet 2 and engages with the flange 12 of the socket 10. As illustrated in FIG. 2, the fitting hole 20 is formed as a constricted cross-sectional shape whose diameter is the largest at the opposite ends and the smallest at the middle.

The projection 3 comprises, beginning with the leading end, a spherical head 30, a neck 31, and a bottom 32. The neck 31 continues from the head 30 smoothly. The bottom 32 continues from the neck 31 smoothly, and has a larger diameter than that of the neck 31. The superficial configuration of the projection 3 agrees with the configuration of the fitting hole 20 of the grommet 2. Moreover, at the trailing end of the projection 3 further down below the bottom 32, a base 33 is formed which has a larger diameter than that of the bottom 32.

The cover body 1 is installed to the engine block in the following manner. As illustrated in FIG. 2, the grommet 2 is first fitted into the socket 10 of the cover body 1. In this instance, the grommet 2 is fitted into the socket 2 while being compressed diametrically, because the outside diameter of the grommet 2 is formed larger than the inside diameter of the peripheral wall 11 of the socket 10 by 2 mm. Note that the outside diameter of the grommet 2 includes that of the convexed streaks 21. When the flange 12 of the socket 10 engages with the annular groove 22 of the grommet 2, the grommet 2 is inhibited from moving in the axial directions. Moreover, the grommet 2 is held by fitting in the socket 2 in such a manner that the convexed streaks 21 contact with the pair of the inner peripheral surfaces of the peripheral wall 11 which faces to each other. In addition, as illustrated in FIG. 2, a clearance 13 is present between the grommet 2 and the socket 10 when the grommet 2 is fitted into the socket 2, because the outside diameter of the bottom surface of the annular groove 22 is formed larger than the inside diameter of the flange 12 by about 2 mm. Therefore, when the grommet 2 is fitted into the socket 10, the clearance 13 makes it easy to insert the grommet 2 into the socket 10. Thus, the fitting operability is enhanced.

The cover body 1 with the grommet 2 thus held by fitting is disposed above the engine block. Then, the projection 3 projecting from the engine block is fitted into the grommet 2. In this instance, it is easy to position the grommet 2 with respect to the projection 3, because the fitting hole 20 of the grommet 2 is formed as a diametrically-enlarging semisphere shape at the lower end.

When the cover body 1 is pressed toward the engine block at the top, the projection 3 is fitted into the fitting hole 20 of the grommet 2 while diametrically enlarging the fitting hole 20. In this instance, it is easy to enlarge the fitting hole 20 diametrically, because the convexed streaks 21 are deformed elastically to contract by being pressed with the peripheral wall 11, and because the clearance 13 is present. Thus, the projection 3 can be fitted into the fitting hole 20 of the grommet 2 with ease.

The projection 3 is fitted snugly into the fitting hole 20 of the grommet 2 in such a manner that the head 30 is protruded from the fitting hole 20 by half as illustrated in FIG. 3. Thus, the cover body 1 is fixed by fitting to the engine block. In this state, the convexed streaks 21 contact with the inner peripheral surface of the peripheral wall 11 of the socket 10 elastically, and the grommet 2 is held firmly in the socket 10 by the elastic reaction force exerted from the convexed streaks 21. Moreover, when the projection 3 is fitted snugly into the fitting holed 20, the projection 3 is inhibited from moving in the up and down directions as well as in the right and left directions. In addition, when the base 33 of the projection 3 contacts with the grommet 2, the projection 3 is inhibited from entering the grommet 2 anymore. Thus, it is possible to securely position the projection 3 with respect to the grommet 2 in fitting.

When the cover body 1 tries to move in the radial directions of the projection 3, a much larger elastic reaction force arises in the convexed streaks 21 of the grommet 2, because the peripheral wall 11 of the socket 10 furthermore compresses the convexed streaks 21 in the moving directions. Accordingly, the cover body 1 is inhibited from moving in the radial directions of the projection 3. Moreover, when the cover body 1 tries to move in the axial directions of the projection 3, the movement is inhibited, because the projection 3 is fitted snugly into the fitting hole 20 of the grommet 2, and because the projection 3 contacts with the grommet 2 at the bottom 33. Thus, in accordance with the present cover according to Example No. 1, the cover body 1 is free of shaking, and exhibits high stability.

When the cover body 1 is thus installed to the engine block, the socket 10, the grommet 2 and the projection 3 are not exposed in the front opposite surface of the cover body 1, because the grommet 2 is held in the socket 10 which is disposed on the rear opposite surface of the cover body 1. Therefore, the cover body 1 is not impaired at all in terms of the appearance.

Moreover, when removing the cover body 1 from the engine block during maintenance, the cover body 1 is pulled in the axial direction of the projection 3 away from the engine block. Accordingly, the head 30 of the projection 3 presses the grommet 2. However, the pressing force results in large vectors in the radial direction of the fitting hole 20 of the grommet 2. Therefore, the fitting hole 20 enlarges diametrically with ease relatively, because the pressing force compresses the convexed streaks 20 of the grommet 2 toward the peripheral wall 11 of the socket 10, and because the clearance 13 is present between the grommet 2 and the socket 10. Thus, it is possible to readily pull off the projection 3 from the grommet 2, and to securely leave the grommet 2 in the socket 10. Therefore, it is not required to refit the grommet 2 into the socket 10 when the cover body 10 is reinstalled to the engine block. Hence, the reinstallation operability is improved.

Note that, in Example No. 1, the convexed streaks 21 are formed parallelly to the axial direction of the grommet 2. However, even when convexed steaks are formed so as to extend in the circumferential direction of the grommet 2 or perpendicularly to the axial direction thereof, they operate and produce advantages similarly to the convexed streaks 21. Moreover, when convexities are formed on the annular groove 22 of the grommet 2, convexities which protrude outward in the radial directions of the grommet 2, such convexities operate and produce advantages similarly to the convexed streaks 21, because they contact with the flange 12 of the socket 10 elastically. In this instance, it is possible to even obviate the convexed streaks 21.

Example No. 2

Figure 4:
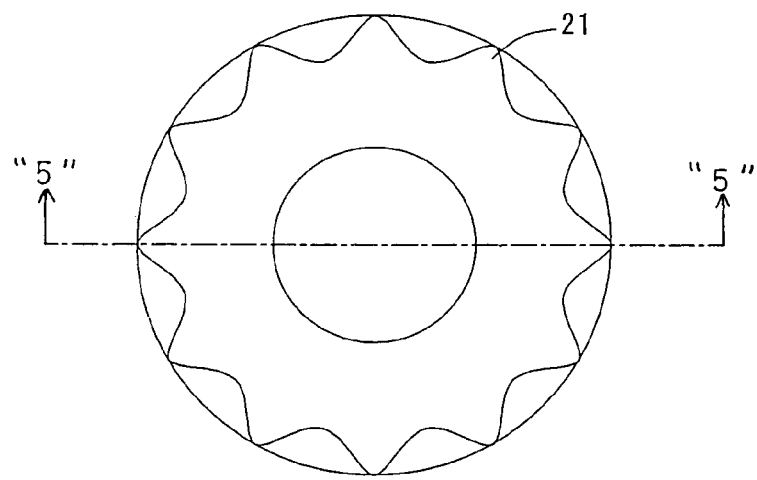
FIG. 4 is a plan view of a grommet used in a cover according to Example No. 2 of the present invention.
Figure 5:
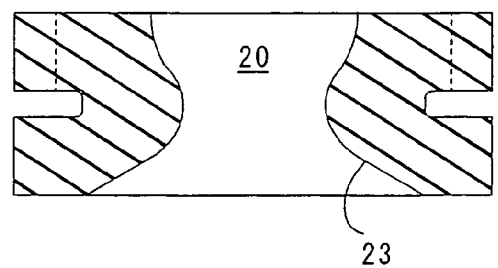
FIG. 5 is a cross-sectional view taken in the direction of the arrows "5"-"5" of FIG. 4.

FIGS. 4 and 5 illustrate a grommet which is used in the present cover according to Example No. 2. Except that a tapered surface 23 is formed at one of the opposite ends of the fitting hole 20, tapered surface whose opening diameter is larger than that of the bottom 32 of the projection 3 but is smaller than that of the base 33; and the convexed streaks 21 are formed on the opposite side of the tapered surface 23 with respect to the annular groove 22, the grommet 2 is arranged in the same manner as that of Example No. 1.

In accordance with the present cover according to Example No. 2, it is possible to fit the projection 3 into the fitting hole 20 of the grommet 2 easily and securely, because the tapered surface 23 guides the projection 3. Thus, the present cover according to Example No. 2 is further upgraded in terms of the assembly operability.

Example No. 3

Figure 6:
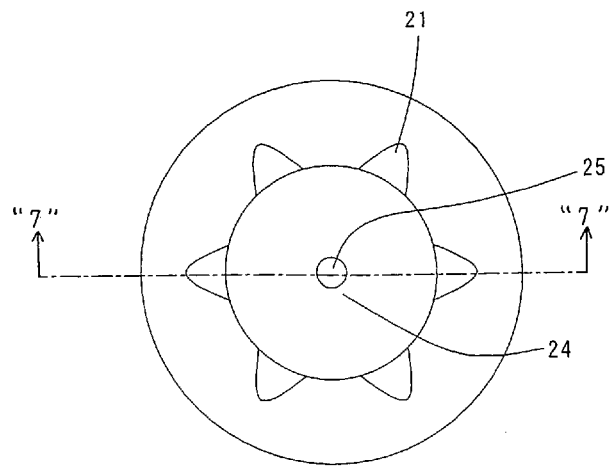
FIG. 6 is a plan view of a grommet used in a cover according to Example No. 3 of the present invention.
Figure 7:
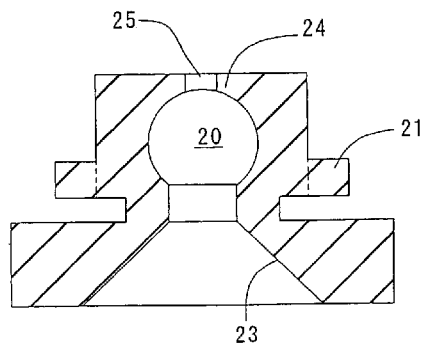
FIG. 7 is a cross-sectional view taken in the direction of the arrows "7"-"7" of FIG. 6.
Figure 8:
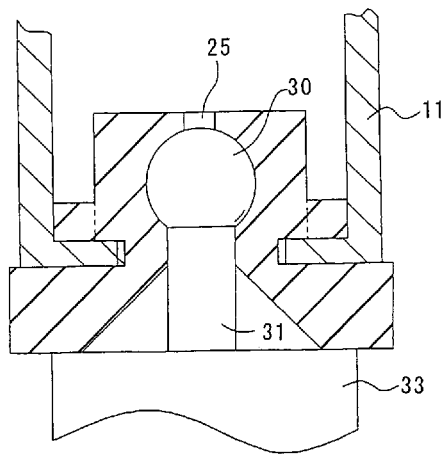
FIG. 8 is a cross-sectional view of the cover according to Example No. 3.
Figure 9:
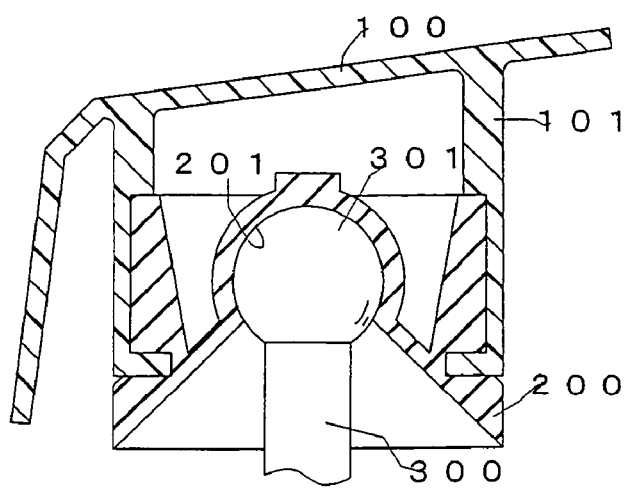
FIG. 9 is a cross-sectional view of a conventional cover.

FIGS. 6 through 8 illustrate the present cover according to Example No. 3. The grommet 2 herein further comprises a regulator 24, and an air vent hole 25. The regulator 24 is disposed at a portion which faces the head 30 of the projection 3, and extends radially inward to close the fitting hole 20. The air vent hole 25 is formed at the center of the regulator 24, and communicates the fitting hole 20 with the outside. Moreover, the axial length and quantity of the convexed streaks 21 are reduced by half of those of the convexed streaks 21 in Example No. 2. Thus, the six convexed streaks 21 are disposed at equal intervals in the circumferential direction of the grommet 2. Note that the other arrangements are the same as those of the grommet 2 used in the present cover according to Example No. 2.

In accordance with the present cover according to Example No. 3, it is possible to fit the projection 3 into the fitting hole 20 of the grommet 2 easily and securely in the same manner as Example No. 2, because the tapered surface 23 guides the projection 3. Moreover, the resistance is reduced more when the grommet 2 is fitted into the socket 10, because the axial length of the convexed streaks 21 is less by further half than that of the convexed streaks 21 in Example No. 2, and because the quantity of the convexed streaks 21 is reduced by half of the convexed streaks 21 in Example No. 2. Thus, the present cover according to Example No. 3 is furthermore upgraded in terms of the assembly operability.

Moreover, the accuracy of positioning the projection 3 is high when the projection 3 is fitted into the fitting hole 20, because the regulator 24 inhibits the projection 3 from advancing in the grommet 2 more than necessary. In addition, there hardly arises such drawback that air residing in the fitting hole 20 exerts resistance in fitting the projection 3 into the fitting hole 20, because air within the fitting hole 20 is evacuated through the air vent hole 25.

Having now fully described the present invention, it will be apparent to one of ordinary skill in the art that many changes and modifications can be made thereto without departing from the spirit or scope of the present invention as set forth herein including the appended claims.

What is claimed is:

1. A cover, comprising:
  a cover body being hard, being formed as a plate shape, comprising opposite surfaces and a socket protruding partially from one of the opposite surfaces, the socket having an inner peripheral surface;
  a tubular grommet held in the socket, being deformable elastically and being formed of a compressible material, and comprising a fitting hole and an outer peripheral surface, the fitting hole having an inner peripheral surface; and
  a projection projecting from an installation member to which the cover is installed, and comprising a head, a neck having a diameter smaller than that of the head and an outer peripheral surface, the projection fittable into the fitting hole of the grommet, whereby holding the cover body detachably to the installation member, wherein a diameter of the head of the projection is smaller than a diameter of the socket at a portion of the socket opposite that protruding from the one of the opposite surfaces of the cover body, whereby the head of the projection may be introduced into the socket from a side of the socket opposite the cover body,
  the grommet further comprising a plurality of convexities having bases disposed on at least one of the outer peripheral surface and the inner peripheral surface of the fitting hole, protruding towards tips thereof in radial directions of the grommet, and contacting with at least one of the inner peripheral surface of the socket and the outer peripheral surface of the projection, wherein the convexities are formed as a substantially triangular cross-sectional shape whose thickness reduces from large to small from the bases to the tips thereof, and wherein the convexities are compressed in the radial directions of the grommet and elastically contact the socket or the projection when the convexities are pressed to an inner peripheral surface of the socket and an outer peripheral surface of the projections, wherein the socket has an inwardly extending flange, and the tubular grommet has an annular groove and is held in the socket by the flange fitted in the annular groove, said grommet being deformable elastically.

2. The cover set forth in claim 1, wherein the grommet is held detachably in the socket; and the convexities are disposed on the outer peripheral surface of the grommet.

3. The cover set forth in claim 2, wherein the grommet is held in the socket in such a manner that the convexities contact with the inner peripheral surface of the socket elastically.

4. The cover set forth in claim 1, wherein the fitting hole is formed as a tapered shape whose inner peripheral surface has a diameter which becomes larger in the direction approaching the installation member.

5. The cover set forth in claim 2, wherein the projection has a superficial configuration comprising the head, the neck continuing from the head smoothly, and a bottom having a larger diameter than that of the neck; and the inner peripheral surface of the fitting hole of the grommet agrees with the superficial configuration of the projection and contacts with the projection entirely.

6. The cover set forth in claim 2, wherein the projection penetrates through the fitting hole, and comprises an outer peripheral surface whose diameter reduces from large to small in the direction away from the head to the neck at least and which contacts with the inner peripheral surface of the fitting hole.

7. The cover set forth in claim 1, wherein the grommet further comprises a regulator disposed at a portion facing the head of the projection and extending radially inward to close the fitting hole, the regulator provided with an air vent hole communicating the fitting hole with the outside.

8. The cover set forth in claim 1, wherein the grommet is made of rubber.

* * * * *